US012320063B2

(12) United States Patent
Kroon et al.

(10) Patent No.: US 12,320,063 B2
(45) Date of Patent: Jun. 3, 2025

(54) METHOD OF PROVIDING OIL AND/OR GREASE RESISTANT TEXTILE MATERIALS

(71) Applicant: ISP INVESTMENTS LLC, Wilmington, DE (US)

(72) Inventors: Gijsbert Kroon, Giessenburg (NL); Meiyan Guo, Pudong New District (CN); Xin Qu, Shanghai (CN)

(73) Assignee: ISP INVESTEMTNS LLC, Wilmington, DE (US)

( * ) Notice: Subject to any disclaimer, the term of this patent is extended or adjusted under 35 U.S.C. 154(b) by 734 days.

(21) Appl. No.: 17/425,667

(22) PCT Filed: Jan. 27, 2020

(86) PCT No.: PCT/US2020/015180

§ 371 (c)(1),
(2) Date: Jul. 23, 2021

(87) PCT Pub. No.: WO2020/154721

PCT Pub. Date: Jul. 30, 2020

(65) Prior Publication Data

US 2022/0090316 A1 Mar. 24, 2022

Related U.S. Application Data

(60) Provisional application No. 62/796,978, filed on Jan. 25, 2019.

(51) Int. Cl.
*D06N 3/02* (2006.01)
*C11D 3/00* (2006.01)
(Continued)

(52) U.S. Cl.
CPC ............ *D06N 3/02* (2013.01); *C11D 3/0036* (2013.01); *C11D 3/225* (2013.01); *D06N 3/0056* (2013.01);
(Continued)

(58) Field of Classification Search
CPC .............................. D06N 3/04; D06N 3/0056
See application file for complete search history.

(56) References Cited

U.S. PATENT DOCUMENTS 2,876,140 A * 3/1959 Sheehan ................ D06M 11/56 252/8.62
4,121,009 A 10/1978 Chakrabarti
(Continued)

FOREIGN PATENT DOCUMENTS

CN 10732473 A 11/2017
CN 107326473 A * 11/2017

OTHER PUBLICATIONS

References cited in the International Search Report of International Application No. PCT/US20/015180, ISR mailed on Apr. 7, 2020.

*Primary Examiner* — Dah-Wei D. Yuan
*Assistant Examiner* — Kristen A Dagenais
(74) *Attorney, Agent, or Firm* — William J. Davis; Nathalie Tietcheu

(57) ABSTRACT

Disclosed is a method for providing a textile material(s) resistant to the deposition of oil- and grease-based air pollutants by treating the textile material(s) with an oil/grease resistant composition. The oil/grease resistant composition comprises a modified polysaccharide(s), particularly, polysaccharides modified with anionic groups, and one or more adjuvant materials.

7 Claims, 4 Drawing Sheets

(51) Int. Cl.
*C11D 3/22* (2006.01)
*D06N 3/00* (2006.01)

(52) U.S. Cl.
CPC .... *C11D 2111/12* (2024.01); *D06N 2209/146* (2013.01)

(56) References Cited

U.S. PATENT DOCUMENTS

| | | | | |
|---|---|---|---|---|
| 4,292,105 | A | 9/1981 | Taylor | |
| 10,732,647 | B2 | 8/2020 | Shen | |
| 2009/0318326 | A1 * | 12/2009 | Lant | C11D 3/225 510/276 |
| 2018/0066212 | A1 | 3/2018 | Pickering et al. | |

* cited by examiner

METHOD OF PROVIDING OIL AND/OR GREASE RESISTANT TEXTILE MATERIALS

FIELD OF THE PRESENT INVENTION

The presently disclosed process(es), procedure(s), method(s), product(s), composition(s), result(s) and/or concept(s) (collectively referred to hereinafter as the "present disclosure") relates to a method of providing a textile material(s) which are resistant to the deposition of air pollutants, more particularly to the deposition of oil and grease-based air pollutants on the surface thereto. The present invention also relates to the use of such textile materials.

BACKGROUND OF THE PRESENT INVENTION

World's air quality is rapidly deteriorating with the increased level of air pollutants. Garments outdoors in polluted environments are susceptible to the deposition of air pollutants on the surface thereto. Thus, garments outdoors in polluted environments also bring pollution indoor. Further, line dried fabrics (especially in Asia) in air with poor quality could be polluted by harmful substances. Among various air pollutants, cigarette smoke is one of the main air pollutants. Cigarette smoke contains high concentrations of many toxic compounds such as particulate matters, polycyclic aromatic hydrocarbons, and other gaseous substances. Cigarette smoke not only damages human health (in the form of first-hand smoke and second-hand smoke), but also pollutes indoor environment. Cigarette smoke residues lingering in the indoor environment are termed as thirdhand smoke (THS). THS tends to adhere to various substrates such as garments, furniture, drapes, walls, bedding, carpet, dust, upholstery and other surfaces. THS constituents may remain adsorbed to surfaces and dust particles, often penetrating deep into materials; as they persist they may react with atmospheric oxidants to yield potentially harmful byproducts. Therefore, THS deposited on garments or other substrates can be a source of long-term exposure to harmful pollutants, thus being detrimental to human health like first-hand smoke and second-hand smoke.

Like cigarette smoke, cooking smoke is also another major air pollutant especially in developing countries. Cooking smoke also badly impacts the indoor air quality and tends to get deposited on the surface of garments and other various substrates. Among various toxic substances present in cigarette and cooking oil smoke, oil and grease-based pollutants have a greater tendency to readily adhere to garments. Garments or fabrics or other textile materials derived from hydrophobic fibers such as polyester, nylon or blends of polyester and cotton have a greater tendency for the deposition of pollutants onto their surfaces due to static and hydrophobic interactions. Further, it is more difficult to shield garments derived from hydrophilic fibers such as cotton against pollutants.

Banks, Ed., Organofluorine Chemicals and their Industrial Applications, Ellis Horwood Ltd., Chichester, England, 1979, pp. 226-234 describes the use of fluorochemicals based products to impart oil and water repellency to variety of substrates such as papers, paper-based products and textile materials. Similarly, the use of fluorochemical based products for imparting water and oil repellency to various substrates is also described in U.S. Pat. Nos. 4,540,497; 4,566,981; 4,426,466; and 4,468,527. However, the use of these fluorochemical based products has been discouraged due to their toxic persistence, and bio-accumulative nature.

Further, the use of fluorochemical based products tend to give hard feeling to the treated textiles. Although the use of silicone softeners is suggested to overcome these problems, silicones are usually not compatible with fluorochemical based products.

Consequently, other products have been introduced to partially or completely replace the fluorochemical compounds. For example, waxes, inorganic material such as silica, organic materials such as polyvinyl alcohol (PVOH) are described in U.S. Pat. Nos. 5,468,526; 5,110,390; 5,283,090; 6,113,978; and US 2005/0042443. However, these foregoing products fail to satisfy the affordability and performance standards of fluorochemical compounds. Further, these products also make the substrates water resistant in nature, i.e., more hydrophobic in nature. The treated substrate thus become more susceptible for the deposition of oil and greased based air pollutants.

Therefore, there exists a strong need for a method for treating textile materials that provides textile materials resistant to the deposition of air pollutants, particularly to oil and grease-based air pollutants, wherein the method is environmentally benign, economically viable, and provides textile materials with improved oil and grease resistant properties.

SUMMARY OF THE PRESENT INVENTION

In one aspect, the present disclosure provides a method for providing a textile material which is resistant to the deposition of oil and grease-based air pollutants, the method comprising the steps of (i) treating the textile material with an oil and grease resistant composition comprising blocky carboxymethyl cellulose (CMC) and optionally at least one adjunct material; and (ii) drying the resultant textile material of step (i).

In one non-limiting embodiment, the blocky carboxymethyl cellulose used in the method of the present disclosure has a degree of substitution (DS) of at least 0.4, and a degree of blockiness (DB) of least 0.5. In another non-limiting embodiment, the degree of substitution (DS) and degree of blockiness (DB) of the blocky carboxymethyl cellulose typically ranges from 0.4 to 1.2, and from 0.5 to 0.8, respectively. Further, the weight average molecular weight of the blocky carboxymethyl cellulose ranges from about 100,000 Daltons to about 1.5 million Daltons. In one non-limiting embodiment of the present disclosure, the blocky carboxymethyl cellulose can be present in an amount of from 0.01 wt. % to 10.0 wt. %, based on the total weight of the composition. In another non-limiting embodiment of the present disclosure, the adjunct material can be present in an amount of from 0.0 wt. % to 90.0 wt. %, based on the total weight of the composition.

In one non-limiting embodiment of the present disclosure, the textile material is treated either (i) by dipping or soaking the textile material in the oil and grease resistant composition, or (ii) by spraying, padding, knife coating or roll coating the oil and grease resistant composition on the surface of the textile material. In another non-limiting embodiment, the textile material is treated during laundry operations. In one non-limiting embodiment, the laundry operations include pre-treating or soaking the textile materials, washing the textile materials with detergents or soaps (main wash), rinsing the textile materials with water, post-wash treating the textile materials after the final rinse, or drying the textile materials after the pre-treating or soaking, or after the main wash, or after the final rise, or after the post-wash treating, or any combinations thereof. In one non-limiting embodiment of the present disclosure, the oil and grease resistant composition is mixed with at least one laundering aid selected from the group consisting of detergents or soaps, stain removal, odor removal, fabric softener, conditioning agents, dry-cleaning agents, brightening agents, enzyme pre-soak agents, pre-wash soil or stain removal agents, starches, fabric finishing agents and sizing agents. In one non-limiting embodiment of the present disclosure, the oil and grease resistant composition is mixed with the laundering aid in a weight ratio of 1:10 to 10:1.

In one non-limiting embodiment of the present disclosure, the oil and grease resistant composition is present in the form of a solution, an emulsion, a dispersion, an aerosol, a gel, a foam, a spray, a solid particulate or a fine powder, and encapsulate and coated forms thereof. In one non-limiting embodiment of the present disclosure, the oil and grease resistant composition is present in the form a solution comprising at least one solvent selected from the group consisting of an aqueous and a non-aqueous based solvent. In another non-limiting embodiment of the present disclosure, the non-aqueous based solvent is selected from the group consisting of ethanol, propanol, isopropanaol, n-butanol, ethylene glycol, propylene glycol, dipropylene glycol, propylene carbonate, butyl carbitol, phenylethyl alcohol, 2-methyl 1,3-propanediol, hexylene glycol, glycerol, polyethylene glycol, 1,2-hexanediol, 1,2-pentanediol, 1,2-butanediol, 1,4-cyclohexanediol, pinacol, 1,5-hexanediol, 1,6-hexanediol, 2,4-dimethyl-2,4-pentanediol, 2,2,4-trimethyl-1,3-pentanediol, 2-ethyl-1,3-hexanediol, phenoxyethanol, and mixtures thereof. In another non-limiting embodiment of the present disclosure, the oil and grease resistant composition is present in the form an aqueous solution.

In one non-limiting embodiment of the present disclosure, the oil and grease resistant composition is uniformly deposited on the surface of the textile material in an amount of about 0.001 gm to about 10.0 gm per gm of the textile material. The textile material according to the present disclosure includes fibers selected from the group consisting of natural fibers, synthetic fibers, and mixtures thereof. In one non-limiting embodiment of the present disclosure, the natural fibers are selected from the group consisting of cotton, wool, silk, and mixtures thereof. In another non-limiting embodiment, the synthetic fibers are selected from the group consisting of polyester fibers, nylon fibers, polyamide, fibers, and combinations thereof.

In one nonlimiting embodiment of the present disclosure, the adjunct material is selected from the group consisting of pH adjusters, surfactants, emulsifiers, detergents adjuvants, builders, rheology modifiers, thickening agents, antioxidants, radical scavengers, chelants, antifoaming agents, conditioning agents, antistatic agent, antimicrobials or preservatives, dyes or colorants, viscosity control agents, pearlizing and opacifying agents, chlorine scavenger, brighteners, perfumes, finishing agents, UV absorbing or blocking agent, anti-reflective, anti-abrasion, gripping agents, flame retardants, antibacterial agents, anti-fungal agents, photodeterrents, and coating agents.

In another aspect, the present disclosure provides a textile material resistant to the deposition of oil and grease-based air pollutants wherein the textile material is prepared in accordance with the method of the present disclosure.

In still another aspect, the present disclosure provides a use of an oil and grease resistant composition comprising blocky carboxymethyl cellulose (CMC) for providing textile materials resistant to the deposition of oil and grease-based air pollutants. In one non-limiting embodiment the present disclosure, the blocky carboxymethyl cellulose has a degree of substitution (DS) of at least 0.4, and a degree of blockiness (DB) of least 0.5. In another non-limiting embodiment, the blocky carboxymethyl cellulose has a degree of substitution (DS) in the range of from 0.4 to 1.2, and a degree of blockiness (DB) in the range of from 0.5 to 0.8. In another non-limiting embodiment of the present disclosure, the blocky carboxymethyl cellulose has a molecular weight in the range of from 100,000 Daltons to 1.5 million Daltons.

In yet another aspect, the present disclosure provides a method for providing a textile material which is resistant to the deposition of oil- and grease-based air pollutants, the method comprising the steps of: (i) treating the textile material with an oil and grease resistant composition comprising blocky carboxymethyl cellulose (CMC); and drying the resultant textile material of step (i). In one non-limiting embodiment of the present disclosure, the blocky carboxymethyl cellulose has a degree of substitution (DS) of at least 0.4, and a degree of blockiness (DB) of least 0.5. In another non-limiting embodiment, the blocky carboxymethyl cellulose has a degree of substitution (DS) in the range of from 0.4 to 1.2, and a degree of blockiness (DB) in the range of from 0.5 to 0.8. In another non-limiting embodiment of to present disclosure, the blocky carboxymethyl cellulose has a molecular weight in the range of from 100,000 Daltons to 1.5 million Daltons. In one non-limiting embodiment, the blocky carboxymethyl cellulose is present in amount of from 0.01 wt. % to 2.0 wt. %, based on the total weight of the composition.

BRIEF DESCRIPTION OF THE PRESENT FIGURES

Objects, Features, and advantages of the present invention will become apparent upon reading the following description in conjunction with the drawings/figures, in which.

DETAILED DESCRIPTION OF THE PRESENT INVENTION

Figure 1:
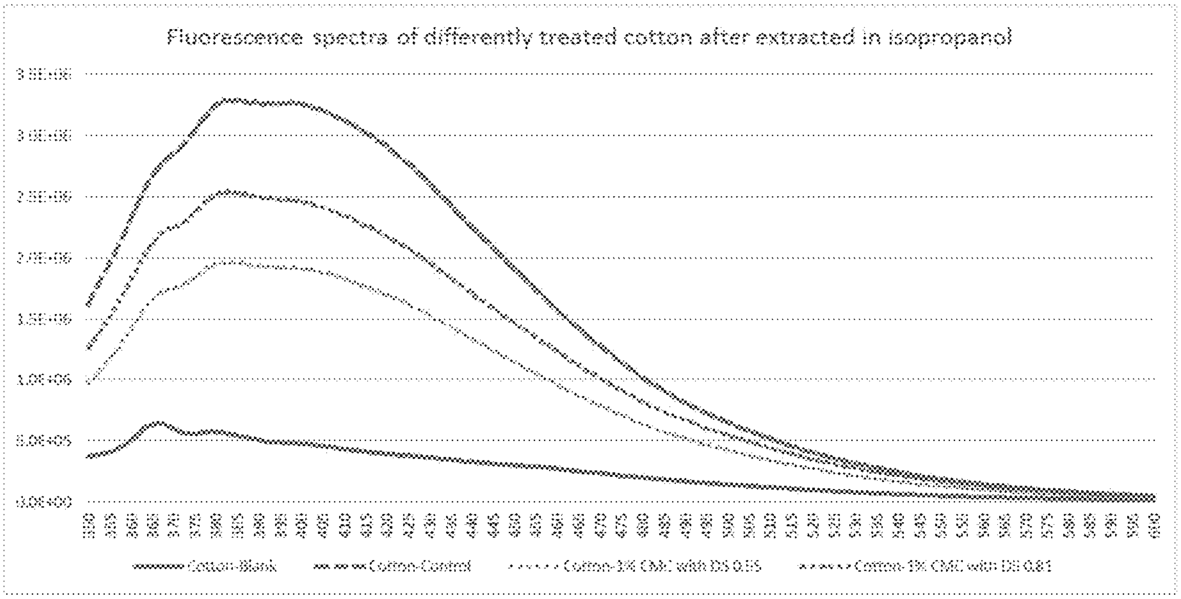
FIG. 1 shows Fluorescence Spectra of the pollutants on (i) smoked untreated cotton fabric; and (ii) smoked blocky carboxymethyl cellulose (CMC) treated cotton fabrics wherein the pollutants are extracted in isopropanol (Excitation wavelength 330 nm).

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more, at least one," and "one or more than one." The use of the term "or" is used to mean "and" unless explicitly indicated to refer to alternatives only if the alternatives are mutually exclusive, although the disclosure supports a definition that refers to only alternatives and "and." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

As used herein the term "textile material" refers to a cloth or fabric made from fibrous structures that include, but are not limited to, fibers, filaments and yarns. These fibrous structures can be staple length fibers or continuous fibers, and can be natural fibers such as cotton, wool, silk, jute and mixtures thereof, or synthetic fibers such as polyacrylonitrile, nylon, polyamide, and polyesters, triacetate, polyethylene, propylene, and mixtures thereof, or any combinations of natural and synthetic fibers.

As used herein the term "textile article" refers to an article made from the textile materials of the present disclosure. Such articles can include, but are not limited to, clothing, garments, fabrics, and other textile products such as towels, other bath linens, bed linens, table cloths, carpets, curtains, upholstery coverings, sleeping bags, tents, shoes, and car interior (such as car seat covers, car floor mats).

As used herein the term, "adjunct materials" means a material or a combination of materials that can be used along with the composition of the present disclosure to deliver one or more of the following benefits to the textile materials and textile articles derived therefrom that can include, but are not limited to, fabric softening, fabric lubrication, fabric relaxation, durable press, wrinkle resistance, wrinkle reduction, ease of ironing, abrasion resistance, fabric smoothing, anti-felting, anti-pilling, crispness, appearance enhancement, appearance rejuvenation, color protection, color rejuvenation, anti-shrinkage, in-wear shape retention, fabric elasticity, fabric tensile strength, fabric tear strength, static reduction, water absorbency or repellency, stain repellency, soil, dirt and stain removal, refreshing, anti-microbial, odor resistance, and any combinations thereof. The adjunct materials can be selected from the group consisting of pH adjusters, surfactants, emulsifiers, detergents adjuvants, builders, rheology modifiers, thickening agents, antioxidants, radical scavengers, chelants, antifoaming agents, conditioning agents, antistatic agent, antimicrobials or preservatives, dyes or colorants, viscosity control agents, pearlizing and opacifying agents, chlorine scavenger, brighteners, perfumes, and mixtures thereof.

The term(s) "carboxymethyl cellulose" and "CMC" used in the present disclosure refer to "blocky carboxymethyl cellulose" having a degree of blockiness (DB) of at least 0.5 and a degree of substitution of at least 0.4.

The present disclosure relates to a method for providing a textile material(s) which is resistant to the deposition of oil and grease-based air pollutants on the surface thereto wherein the method comprises a step of treating the textile material(s) with an oil and grease resistant composition. The oil and grease resistant composition used in the method of the present disclosure can comprises a polysaccharide(s)

based active ingredient. The oil and grease resistant composition according to the present disclosure can further optionally comprise at least one adjunct material.

The polysaccharide(s) based active ingredient according to the present disclosure can include polysaccharide(s) modified with at least one anionic group. The polysaccharides(s) modified with at least one anionic group according to the present disclosure comprises a polysaccharide backbone wherein at least one functional group of the individual polysaccharide monomer unit(s) is substituted by at least one anionic group. The polysaccharide(s) useful for the purpose of the present disclosure can include any naturally occurring polysaccharides and derivatives thereof. Examples of such polysaccharide(s) can include, but are not limited to, cellulose, starch, xyloglucan, xylan, carrageenan, alginates, pectin and galactomannan. In one non-limiting embodiment of the present disclosure, the polysaccharide is cellulose. The anionic groups which can be used for modification of the polysaccharide(s) according to the present disclosure can include, but are not limited, to carboxyl groups, sulphate groups, phosphate groups, or any combinations thereof. In one non-limiting embodiment of the present disclosure, the anionic group is carboxyl group.

In one non-limiting embodiment of the present disclosure, the polysaccharide(s) modified with at least one anionic group includes carboxyalkyl cellulose and/or its derivatives. Examples of such carboxyalkyl cellulose and/or its derivatives can include, but are not limited to, carboxymethyl cellulose (CMC), carboxyethyl cellulose, and carboxypropyl cellulose. In one non-limiting embodiment, the polysaccharide(s) modified with at least one anionic group can include carboxymethyl cellulose (CMC).

In another aspect, the present disclosure provides a method of providing a textile material resistant to the deposition of oil and grease-based air pollutants on the surface thereto wherein the method comprises the step of treating the textile material(s) with an oil and grease resistant composition. The oil and grease resistant composition according to the present disclosure comprises a carboxymethyl cellulose. Further, the oil and grease resistant composition used in the method of the present disclosure can optionally comprises at least one adjunct material.

The chemical and physical properties of the polysaccharide(s) modified with anionic group(s) depend not only on the average degree of polymerization and substitution, but also on the overall solubility as well as distribution of the substituents along the polysaccharide chains. The inventors of the present disclosure have surprisingly found that the improved or enhanced resistant to oil and grease-based air pollutants in the textile materials can be achieved by using the carboxymethyl cellulose (CMC) having a specific degree of substitution and a specific degree of blockiness. Such carboxymethyl cellulose for the purpose of the present disclosure also referred as blocky carboxymethyl cellulose (CMC).

In one non-limiting embodiment of the present disclosure, the blocky carboxymethyl cellulose (CMC) can have a degree of substitution (DS) of at least 0.4. In another limiting embodiment, the blocky carboxymethyl cellulose can have a degree of substitution (DS) in the range of from about 0.40 to about 1.20, or from about 0.40 to about 0.9, or from about 0.45 to about 0.8. The term "degree of substitution" (or DS) is well known to those skilled in the art of cellulosic polymer chemistry, and generally refers to average number of OH groups that have been substituted in one anhydrous glucose unit. The degree of substitution of blocky carboxymethyl cellulose can be determined according to ASTM D 1439-03 "standard Test Methods for sodium carboxymethyl cellulose; Degree of Etherification, Test Method B: Non-aqueous Titration."

Further, the blocky carboxymethyl cellulose (CMC) according to the present disclosure can have a degree of blockiness (DB) of at least 0.5. In one non-limiting embodiment, the blocky carboxymethyl cellulose can have a degree of blockiness (DB) in the range of from about 0.5 to about 1.2, from about 0.45 to about 0.8, or from about 0.4 to about 0.7. The term degree of blockiness (DB) is well known to those skilled in the art of cellulosic polymer chemistry, and generally refers to the extent to which substituted (or unsubstituted) sugar unites are clustered on the polysaccharide backbone. Substituted polysaccharides having lower DB can be characterized as having a more even distribution of the unsubstituted sugar units along the polysaccharide backbone. Substituted polysaccharide having a higher DB can be characterized as having more clustering of the unsubstituted sugar units along the polysaccharide backbone. The methods to measure the DB may vary as a function of the substituent. The blockiness of the polysaccharide derivatives can be determined by comparing the amount of unsubstituted sugar units produced by acid treatment with the amount of unsubstituted sugar units produced by enzymatic treatment. At a given DS, the relative amount of unsubstituted sugar monomers produced by enzymatic treatment increases with increasing blockiness, as described in V. Stiggsson et al, Cellulose, 2006, v13, pp 705-712. The degree of blockiness is calculated by dividing the quantity of enzyme-liberated sugar units by the quantity of acid-liberated sugar units.

In one non-limiting embodiment, the weight average molecular weight (Mw) of the blocky carboxymethyl cellulose can vary in the range of from about 100,000 Daltons to 1,500,000 Daltons. In another non-limiting embodiment, the weight average molecular weight (Mw) of blocky carboxymethyl cellulose can vary in the range of from about 500,000 Daltons to 1300,000 Daltons, and from about 200,000 Daltons to about 900,000 Daltons. The weight average molecular weight of blocky carboxymethyl cellulose used in the method of the present disclosure can be measured by standard analytical measurements, such as size exclusion chromatography (SEC).

The introduction of one or more of the carboxyl groups into the molecules of the polysaccharide can be achieved by methods known in the pertinent art, for example, by reacting the polysaccharide(s) with (i) mono halogen substituted fatty acid(s) such as monochloro acetic acid; or with (ii) certain anhydrides, for example, succinic anhydride, maleic anhydride or citraconic anhydride; or with (iii) methyl and ethyl esters of acrylic acid, crotonic acid or itaconic acid in the presence of an alkaline catalyst; or with (iv) acrylonitrile in the presence of an alkaline catalyst followed by hydrolysis of the cyanoethyl groups; or with (v) sodium periodate followed by a treatment with sodium chlorite for transforming the carbonyl groups into carboxyl groups.

Adjunct Materials

The oil and grease resistant composition useful for the method of the present disclosure can further optionally comprise at least one adjunct material. These adjunct materials can be added to provide one or more additional benefits or properties to the textile materials that can include, but are not limited to, fabric softening, fabric lubrication, fabric relaxation, durable press, wrinkle resistance, wrinkle reduction, ease of ironing, abrasion resistance, fabric smoothing, anti-felting, anti-pilling, crispness, appearance enhancement, appearance rejuvenation, color protection, color rejuvenation, anti-shrinkage, in-wear shape retention, fabric elasticity, fabric tensile strength, fabric tear strength, static reduction, water absorbency or repellency, stain repellency, soil, dirt and stain removal, refreshing, anti-microbial, odor resistance, and any combinations thereof. The adjunct materials can be selected from the group consisting of pH adjusters, surfactants, emulsifiers, detergents adjuvants, builders, rheology modifiers, thickening agents, antioxidants, radical scavengers, chelants, antifoaming agents, conditioning agents, antistatic agent, antimicrobials or preservatives, dyes or colorants, viscosity control agents, pearlizing and opacifying agents, chlorine scavenger, brighteners, perfumes, and mixtures thereof.

pH of the oil and grease resistant composition used in the method of the present disclosure can be maintained in the range of from about 2 to about 6, or from about 3 to about 5, or from about 3 to about 4. The pH is typically maintained by using a suitable buffer system. The buffer system useful for the oil and grease resistant composition of the present disclosure can be any combination of an acid and a base. In one non-limiting embodiment of the present disclosure, the buffer system comprises an inorganic acid and an organic acid, and a salt(s) thereof to provide the composition with a pH value of from about 2 to about 6 at 25° C.

Examples of the inorganic acid useful for the buffer system can include, but are not limited to, hydrogen chloride (HCl), sulfuric acid ($H_2SO_4$), nitric acid ($HNO_3$), phosphoric acid ($H_3PO_4$), and any combinations thereof.

Similarly, examples of the organic acid sueful for the buffer system according to the present disclosure can include, but are not limited to, an alpha-hydroxy acid, a polycarboxylic acid, and any combinations thereof. Accordingly, the organic acid has an acidic functional group having a pKa of about 4.5 or less. In one non-limiting embodiment, the organic acid has a second acidic functional group having a pKa of about 6 or less.

The organic acid can have a molecular weight less than about 500 grams per mole (g/mol). For example, but not by way of limitation, the molecular weight of the organic acid can vary in the range of from about 90 g/mol to about 400 g/mol, or from about 100 g/mol to about 300 g/mol, or from about 130 g/mol to about 250 g/mol, or from about 150 g/mol to about 200, or about 190 g/mol. In one non-limiting embodiment, the organic acid can be soluble in water in an amount greater than about 0.2 moles per liter at 25° C. For example, but not by way of limitation, the water solubility of the organic acid can be about 0.3 mol/L or more, or about 0.4 mol/L or more, or about 0.5 mol/L or more.

Examples of such organic acids can include, but are not limited to, lactic acid, citric acid, tartaric acid, gluconolactive acid, pimelic acid, glyoxylic acid, aconitic acid, ethylenediaminetetraacetic acid, L-glutamic acid, malic acid, malonic acid, and combinations thereof. Further, examples of the inorganic acid and organic acid salts(s) can include, but are not limited to, its alkali metal salts such as the sodium salt and the potassium salt; its ammonium salt; and its alkanolamine salts such as the triethanolamine salt.

The oil and grease resistant composition used in the method of the present disclosure can comprise surfactants as one of the adjunct materials. These surfactants can be an anionic surfactant, a cationic surfactant, an amphoteric and zwitterionic surfactant, a nonionic surfactant, or any combinations thereof.

Anionic surfactants which are suitable for use herein can include the water-soluble salts. The water-soluble salts can be alkali metal and ammonium salts of organic sulfuric reaction products having an alkyl group containing from about 10 to about 20 carbon atoms and a sulfonic acid or sulfuric acid ester group. (Included in the term "alkyl" is the alkyl portion of acyl groups).

Examples of this group of anionic surfactants can include, but are not limited to, (a) the sodium, potassium and ammonium alkyl sulfates, especially those obtained by sulfating the higher alcohols ($C_8$-$C_{18}$ carbon atoms) such as those produced by reducing the glycerides of tallow or coconut oil; (b) the sodium, potassium and ammonium alkyl polyethoxylate sulfates, particularly those in which the alkyl group contains from about 10 to about 22 carbon atoms, or from about 12 to about 18 carbon atoms, and wherein the polyethoxylate chain contains from 1 to about 15, or from 1 to about 6 ethoxylate moieties; and (c) the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383, which are incorporated herein by reference in their entirety.

The sulphate or sulphonate surfactants can be selected from $C_{11}$-$C_{18}$ alkyl benzene sulphonates (LAS); $C_8$-$C_{20}$ primary, branched-chain and random alkyl sulphates (AS); $C_{10}$-$C_{18}$ secondary (2,3) alkyl sulphates; $C_{10}$-$C_{18}$ alkyl alkoxy sulphates (AExS) wherein x is from 1-30; $C_{10}$-$C_{18}$ alkyl alkoxy carboxylates comprising 1-5 ethoxy units; mid-chain branched alkyl sulphates as disclosed in U.S. Pat. Nos. 6,020,303 and 6,060,443; mid-chain branched alkyl alkoxy sulphates as disclosed in U.S. Pat. Nos. 6,008,181 and 6,020,303; modified alkylbenzene sulphonate (MLAS) as disclosed in WO 99/05243, WO 99/05242, WO 99/05244, WO 99/05082, WO 99/05084, WO 99/05241, WO 99/07656, WO 00/23549, and WO 00/23548; methyl ester sulphonate (MES); and alpha-olefin sulphonate (AOS). All the above described patents and patent publications are hereby enclosed by reference in their entirety.

The paraffin sulphonates can be monosulphonates or disulphonates and usually are mixtures thereof, obtained by sulphonating paraffins of about 10 to about 20 carbon atoms. In one non-limiting embodiment, the sulphonates are those of $C_{12}$-$C_{18}$ carbon atoms chains. In another non-limiting embodiment, the sulphonates are $C_{14}$-$C_{17}$ carbon atoms chains. Paraffin sulphonates that have the sulphonate group(s) distributed along the paraffin chain are described in U.S. Pat. Nos. 2,503,280; 2,507,088; 3,260,744; 3,372,188 and in DE 735 096, which are hereby enclosed by reference in their entirety.

Alkyl glyceryl sulphonate surfactants and alkyl glyceryl sulphate surfactants generally used have a high monomer content (greater than about 60.0 wt. % by weight of the alkyl glycerol sulphonate surfactant). As used herein "oligomer" includes dimer, trimer, tetramer, and oligomers up to heptamers of alkyl glyceryl sulphonate surfactant and alkyl glyceryl sulphate surfactant. Minimization of the monomer content can be from 0 wt. % to about 60 wt. %, or from 0 wt. % to about 55 wt. %, from 0 wt. % to about 50 wt. %, from 0 wt. % to about 30 wt. %, by weight of the alkyl glyceryl sulphonate surfactant and alkyl glyceryl sulphate surfactant present.

The alkyl glyceryl sulphonate surfactant and alkyl glyceryl sulphate surfactant for use herein can include such surfactants having an alkyl chain length of $C_{10}$-$C_{40}$, or $C_{10}$-$C_{22}$, or $C_{12}$-$C_{18}$, or $C_{16}$-$C_{18}$. The alkyl chain can be branched or linear, wherein when present, the branches comprise a $C_1$-$C_4$ alkyl moiety, such as methyl ($C_1$) or ethyl ($C_2$). These surfactants are described in detail in WO2006/041740, which is enclosed herein by reference in its entirety.

The alkyl glyceryl sulphate/sulphonate surfactant is optionally present at a level of at least 10%, or from 10% to about 40%, or from 10% to about 30% by weight of the total composition.

The anionic surfactant can be dialkylsulfosuccinates, wherein the dialkyl sulfosuccinates can be a $C_6$-$C_{15}$ linear or branched dialkyl sulfosuccinate. The alkyl moieties can be symmetrical (i.e., the same alkyl moieties) or asymmetrical (i.e., different alkyl moieties). In one non-limiting embodiment, the alkyl moiety is symmetrical. The dialkyl sulfosuccinates can be present in an amount of from about 0.5 wt. % to about 10.0 wt. % by weight of the composition.

Suitable nonionic surfactants for use in the present oil and grease resistant composition can include alkoxylated materials, particularly addition products of ethylene oxide and propylene oxide with fatty alcohols, fatty acids and fatty amines.

The alkoxylated materials can have the general formula:

$$R—Y—(CH_2CH_2O)_zH$$

where R is a hydrophobic moiety, typically being an alkyl or alkenyl group, the group being linear or branched, primary or secondary, and having from about 8 to about 25 carbon atoms, or from about 10 to about 20 carbon atoms, or from about 10 to about 18 carbon atoms. R can also be an aromatic group, such as a phenolic group, substituted by an alkyl or alkenyl group as described above; Y is a linking group, typically being O, CO.O, or CO.N($R_1$), where $R_1$ is H or a $C_1$-$C_4$ alkyl group; and z represents the average number of ethoxylate (EO) units present, the number being about 8 or more, or about 10 or more, or from about 10 to about 30, or from about 12 to about 25, or from about 12 to about 20.

Examples of suitable nonionic surfactants can include the ethoxylates of mixed natural or synthetic alcohols in the "coco" or "tallow" chain length. In one non-limiting embodiment, the non-ionic surfactants can be condensation products of coconut fatty alcohol with about 15-20 moles of ethylene oxide and condensation products of tallow fatty alcohol with about 10-20 moles of ethylene oxide.

The ethoxylates of secondary alcohols such as 3-hexadecanol, 2-octadecanol, 4-eicosanol, and 5-eicosanol can also be used. Exemplary ethoxylated secondary alcohols can have formulae C12-EO(20); C14-EO(20); C14-EO(25); and C16-EO(30). The secondary alcohols can include Tergitol™ 15-S-3(available from The Dow Chemical Company) and those disclosed in PCT/EP2004/003992, which is enclosed herein by reference in its entirety.

Polyol-based nonionic surfactants can also be used, examples including sucrose esters (such as sucrose monooleate), alkyl polyglucosides (such as stearyl monoglucoside and stearyl triglucoside), and alkyl polyglycerols.

The nonionic surfactants suitable for use in the present oil and grease resistant composition can be reaction products of long-chain alcohols with several moles of ethylene oxide having a weight average molecular weight of about 300 to about 3000 Daltons. One of the nonionic surfactants of the blend is a lower hydrophillic ethoxylate. The lower hydrophillic ethoxylate is linear alcohol ethoxylate where a $C_9$-$C_{11}$ and $C_{12}$-$C_{18}$ linear alcohol chain is ethoxylated with an average of 1.0 to 5.0 moles of ethylene oxide per chain, or 2.0 to 4.0 moles of ethylene oxide.

The nonionic surfactant can also be a higher ethoxylate. The higher ethoxylate is a linear alcohol ethoxylate where a $C_9$-$C_{11}$ and $C_{12}$-$C_{18}$ linear alcohol chain is ethoxylated with at least 6.0 moles of ethylene oxide per chain, or an average of 6.0 to 20.0 moles of ethylene oxide per chain, or an average of 6.0 moles to 12.0 moles of ethylene oxide per chain. The ratio of lower ethoxylate to higher ethoxylate can be in the range of from about 1:10 to about 10:1, or from about 1:4 to 4:1.

In one non-limiting embodiment, the nonionic surfactants can be mixtures of $C_9$-$C_{11}$ linear alcohols ethoxylated with an average of 2.5, 6.0 and 8.0 moles of ethylene oxide per chain. The ratio of the 6 mole ethoxylates to 2.5 moles ethoxylates in the blend is preferably in the range of 1.5:1 to 2:1 and for 8 mole ethoxylates is in the range of 2.3:1.

Amphoteric surfactants suitable for use in the present oil and grease resistant composition can include those that are broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecyl-aminopropionate, sodium 3-dodecylaminopropane sulfonate, sodium lauryl sarcosinate, N-alkyltaurines such as the one prepared by reacting dodecylamine with sodium isethionate according to the teaching of U.S. Pat. No. 2,658,072, N-higher alkyl aspartic acids such as those produced according to the teaching of U.S. Pat. No. 2,438,091, and the products described in U.S. Pat. No. 2,528,378.

Zwitterionic surfactants suitable for use in the present oil and grease resistant composition can include those that are broadly described as derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one contains an anionic group, e.g., carboxy, sulfonate, sulfate, phosphate, or phosphonate. Zwitterionic surfactants which are suitable include betaines, including cocoamidopropyl betaine.

The amphoteric surfactants suitable for use in the present oil and grease resistant composition can also include alkylamphoacetates including lauroamphoacetate and cocoamphoacetate. Alkylamphoacetates can be comprised of monoacetates and diacetates. In some types of alkylamphoacetates, diacetates are impurities or unintended reaction products.

The surfactant can be present in an amount of from about 0.0 wt. % to about 80.0 wt. %, or from about 0.0 wt. % to about 50.0 wt. %, or from about 0.0 wt. % to about 30.0 wt. %, or from about 0.0 wt. % to about 20.0 wt. % or from about 0.0 wt. % to about 10.0 wt. %, or from about 0.0 wt. % to about 5.0 wt. %, or from about 0.0 wt. % to about 2.0 wt. % of the total composition.

The detergency adjuvants or builders can also be used in the present oil and grease resistant composition to improve the surface properties of surfactants. Builders can be organic and inorganic. The inorganic builders can include, but are not limited to, alkali metal, ammonium or alkanolamine polyphosphates; alkali metal pyrophosphates; eolites; silicates; alkali metal or alkaline earth metal borates, carbonates, bicarbonates or sesquicarbonates; and cogranules of alkali metal (sodium or potassium) silicate hydrates and of alkali metal (sodium or potassium) carbonates.

The organic builders can include, but are not limited to, organic phosphates, polycarboxylic acids and their water-soluble salts, and water-soluble salts of carboxylic polymers. Examples can include, but are not limited to, polycarboxylate or hydroxypolycarboxylate ethers, polyacetic acids or their salts (nitriloacetic acid, N,N-dicarboxymethyl-2-aminopentanedioic acid, ethylenediaminetetraacetic acid, diethylenetriaminepentaacetic acid, ethylenediaminetetraacetates, nitrilotriacetates), ($C_5$-$C_{20}$ alkyl)succinic acid salts, polycarboxylic acetal esters, polyaspartic or polyglutamic acid salts, citric acid, gluconic acid or tartaric acid or their salts.

The auxiliary cleaning agents can be copolymers of acrylic acid and of maleic anhydride or acrylic acid homopolymers type. The bleaching active agents can be perborates or percarbonates type, which may or may not be combined with acetylated bleaching activators, such as N,N,N',N'-tetraacetylethylenediamine (TAED), or chlorinated products of the chloroisocyanurates type, or chlorinated products of the alkali metal hypochlorites type.

Either hydrophobic or hydrophilic biocidal active agents can also be used. A biocidal agent is considered as being "hydrophobic" when its solubility in water at 25° C. is less than about 1% by weight, preferably less than about 0.1% by weight. As examples of hydrophobic biocidal agents, mention can be made of para-chloro-meta-xylenol or dichloro-meta-xylenol, 4-chloro-m-cresol, resorcinol monoacetate, mono- or poly-alkyl or -aryl phenols, cresols or resorcinols, such as o-phenylphenol, p-tert-butylphenol or 6-n-amyl-m-cresol, alkyl and aryl-chloro- or -bromophenols, such as o-benzyl-p-chlorophenol, halogenated diphenyl ethers such as 2',4,4'-trichloro-2-hydroxy-diphenyl ether (triclosan) and 2,2'-dihydroxy-5,5'-dibromo-diphenyl ether, and chlorophenesin (p-chloro-phenylglyceric ether).

As examples of hydrophilic biocidal agents, mention can be made of cationic biocides such as quaternary monoammonium salts such as cocoalkylbenzyldimethylammonium, ($C_{12}$-$C_{14}$)alkylbenzyldimethylammonium, cocoalkyldichlorobenzyldimethylammonium, tetradecylbenzyldimethylammonium, didecyldimethylammonium or dioctyldimethylammonium chlorides, myristyltrimethylammonium or cetyltrimethylammonium bromides monoquaternary heterocyclic amine salts such as laurylpyridinium, cetylpyridinium or ($C_{12}$-$C_{14}$)alkylbenzylimidazolium chlorides, and triphenylphosphonium fatty alkyl salts such as myristyltriphenylphosphonium bromide.

Polymeric biocides can also be used. Examples can include, but are not limited to, those derived from the reactions of epichlorohydrin and of dimethylamine or of diethylamine, of epichlorohydrin and of imidazole, of 1,3-dichloro-2-propanol and of dimethylamine, of 1,3-dichloro-2-propanol and of 1,3-bis(dimethylamino)-2-propanol, of ethylene dichloride and of 1,3-bis(dimethylamino)-2-propanol, and bis(2-chloroethyl) ether and of N,N'-bis(dimethylaminopropyl)-urea or thiourea; biguanidine polymeric hydrochlorides; amphoteric biocides such as derivatives of N—(N'—C8-C18alkyl-3-aminopropyl)glycine, of N—(N'—(N"—C8-C18 alkyl-2-aminoethyl)-2-aminoethyl) glycine, of N,N-bis(N'—C8-C18alkyl-2-aminoethyl)glycine, such as (dodecyl)(aminopropyl)glycine and (dodecyl)(diethylenediamine)glycine; amines such as N(3-aminopropyl)-N-dodecyl-1,3-propanediamine; halogenated biocides, for instance iodophores and hypochlorite salts, such as sodium dichloroisocyanurate; and phenolic biocides such asphenol, resorcinol and cresols.

Other optional adjunct materials can also be added in the present oil and grease resistant composition to provide one or more additional benefits or properties to the textile materials. These optional adjunct materials can include, but are not limited to, perfume carriers, hydrotropes, anti-redeposition agents, soil-release agents, polyelectrolytes, optical brightening agents, anti-shrinking agents, anti-wrinkle agents, anti-spotting agents, sunscreens, anti-corrosion agents, drape imparting agents, deodorants, emollients, moisturizers, foam boosters, germicides, lathering agents, skin conditioners, solvents, stabilizers, and superfatting agents.

The adjunct materials can be present in an amount of from about 0.0 to 90.0 wt. %, or from about 0.0 wt. % to about 70.0 wt. %, or about 0.0 wt. % to about 50.0 wt. %, from about 0.0 wt. % to about 30.0 wt. %, or from about 0.1 wt. % to about 30.0 wt. %, or from about 0.5 wt. % to about 10.0 wt. %, or from about 1.0 wt. % to about 5.0 wt. % of the composition weight.

The oil and grease resistant composition used in the method of the present disclosure can be present in any form known to those skilled in the art such as in the form of a solution, an emulsion, a dispersion, a gel, an aerosol, a spray, a foam, a solid particulate or a fine powdery form, and encapsulate and coated forms thereof.

Treating Method(s)

The method of providing a textile material (s) which is resistant to the deposition of oil and grease-based air pollutants on the surface thereto according to the present disclosure comprises a method step of treating the textile materials with the oil and grease resistant composition of the present disclosure. The method step of treating the textile materials comprises a step of applying the oil and grease resistant composition on the textile materials. The composition can be applied directly by employing methods known in the art for direct applications such as dipping or soaking, spraying, or any other suitable methods known for such applications. Alternatively, the composition can be applied during laundry operation, for example, during main wash cycle, during rinse cycle, during drying cycle, during pre-soaking cycle (before the main wash), during post-wash treating cycle, or during any combinations thereof.

Direct Application

In one non-limiting embodiment, the method according to the present disclosure comprises a direct application of the oil and grease resistant composition on the textile materials. In this embodiment, the composition can be applied by employing methods known in the art. These methods can include, but are not limited to, dipping, spraying, soaking, padding, knife coating, and roll coating. During this method the composition can be formulated in any forms suitable for such direct applications. Examples of such suitable forms can include, but are not limited to, solutions, aerosols, emulsions, dispersions, foam, sprays, fine powdery solid forms, a solid particulate and fine powdery form, and encapsulate and coated forms thereof.

The textile material treated with the oil and grease resistant composition according to the present disclosure is then subjected to a drying process. The drying process is very crucial step for the effective deposition of the oil and grease resistant composition on the surface of the textile materials. In one non-limiting embodiment of the present disclosure, the treated textile materials can be dried under ambient conditions. Subsequent to the drying under ambient conditions, the treated textile material can optionally be heat treated using a heating source that can include, but is not limited to, an automatic dryer, steam, a heating iron, and heated air from blow dryer. The heat-treatment according to the present disclosure can be carried out in the same manner as in conventional textile processing methods. In the embodiment wherein, the treated textile materials are dried under ambient conditions followed by heat treating using the heating source, both the operations can be carried out simultaneously in one step, or these operations can optionally be conducted in separate steps, providing that the heat treating using the heating source is performed after the drying under ambient conditions.

Indirect Application

In another non-limiting embodiment of the present disclosure, the treatment of the textile material (s) can be carried out during laundry operations. In this embodiment, the composition can be added during any of the laundry operations that can include, but are not limited to, pre-soaking cycle, main wash cycle, rinse cycle, post-wash treating cycle, and drying cycle. The oil and grease resistant composition according to the present disclosure d can be added alone during the laundry operations. Alternatively, the oil and grease resistant composition can be combined with any of the laundering aids and added during the laundry operations. The laundering aids can include, but are not limited to, detergents or soaps, stain removal, odor removal, fabric softener, conditioning agents, dry-cleaning agents, brightening agents, enzyme pre-soak agents, pre-wash soil or stain removal agents, starches, fabric finishing agents and sizing agents.

During the Wash Cycle

In one non-limiting embodiment of the present disclosure, the oil and grease resistant composition can be added during the main wash cycle of the laundry operation. In this embodiment, cleaning of the textile materials as well as treatment thereof with the oil and grease resistant composition of the present disclosure can be practiced simultaneously.

In one non-limiting embodiment of the preset disclosure, the oil and grease resistant composition can be added alone during the wash cycle. In this embodiment, the amount of surfactant present in the oil and grease resistant composition of the present disclosure can vary from about 0.0 wt. % to about 50.0 wt. %, from about 0.0 wt. % to about 30.0 wt. %, from about 0.0 wt. % to about 20.0 wt. %, based on the total weight of the composition. Further, the oil and grease resistant composition of the present disclosure can also comprise builders and one or more of the other optional adjunct materials as hereinabove described.

In another non-limiting embodiment, the oil and grease resistant composition can be added along with conventional detergents during the wash cycle. In this embodiment, the surfactants can be present in an amount of from about 0.0 wt. % to about 40.0 wt. % of the composition. In one non-limiting embodiment, the amount of surfactants can vary from about 0.1 wt. % to about 40.0 wt. %, or from about 1 wt. % to about 20.0 wt. %. Further, the oil and grease resistant composition used in the method of the present disclosure can also comprise one or more of the other optional adjunct materials as hereinabove described.

The oil and grease resistant composition used in the method of the present disclosure can be added in either a washing machine or in any other container useful for hand-washing the textile materials such as a tub, a bucket, or any other container. The textile materials treated with the oil and grease resistant composition during the wash cycle can be rinsed with fresh water followed by drying under ambient conditions with optional heating using the heat source.

During the Rinse Cycle

In another non-limiting embodiment of the present disclosure, the oil and grease resistant composition can be added during the rinse cycle of the laundry operation.

The oil and grease resistant composition according to the present disclosure can be added alone during the rinse cycle. In this embodiment, the composition can optionally comprise fabric softeners or fabric conditioners and other optional adjunct materials as described above.

Alternatively, the oil and grease resistant composition according to the present disclosure can be added along with conventional laundry aids used during the rinse cycle. Examples of such laundering aids can include, but are not limited to, fabric softeners, fabric conditioners and the like. The treatment of textile materials during the rinse cycle according to the present disclosure can be carried out either in a washing machine or in any other container useful for rinsing operation such as a tub, a bucket, or any other containers. The textile materials treated with the oil and grease resistant composition according to the method of the present disclosure during the rinse operation can be dried under ambient conditions followed with optional heat treating.

During the Pre-Soaking Cycle

In yet another non-limiting embodiment of the present disclosure, the treatment of the textile materials can be performed during a separate soak or treatment cycle before the textile materials are laundered. In this embodiment, the effective amount of the oil and grease resistant composition of the present disclosure is usually dissolved in a suitable medium, preferably water, either in a washing machine or in any other container such as a washing tub or a bucket. In one embodiment, the composition can be added alone. In another embodiment, the composition can be added along with pre-wash laundering aids. Any conventional pre-wash laundry aids can be used. The textile materials are then dipped and allowed to soak in the composition for a time period sufficient for the effective and uniform deposition of the composition onto the textile materials. The treated textile materials thus obtained can be dried directly under ambient conditions with optional heat-treating. Alternatively, the treated textile materials can be rinsed with fresh water and washed with detergent followed by drying under ambient conditions with optional heat-treating.

During the Drying Cycle

In still another non-limiting embodiment of the present disclosure, the treatment of the textile materials can be performed during a drying step. The drying step can be performed during any stages of the laundry operations such as after the pre-treating or pre-soaking cycle or after the main wash or after the final rinse or after the post-wash treating cycle, or any combinations thereof. In this embodiment, the composition can be added alone. Alternatively, the composition can be added along with any conventional laundry aids used during the drying cycle.

The oil and grease resistant composition according to the present disclosure can be formulated in any forms suitable for its application during laundry operations. Examples of such forms can include, but are limited to, solutions, aerosols, emulsions, dispersions, foam, gel, sprays, a solid particulate and fine powdery, and encapsulate and coated forms thereof.

Further, the oil and grease resistant composition according to the present disclosure is suitable for being added along with both solid as well as liquid laundering aids used during any of the laundry operations.

The amount of the oil and grease resistant composition used in the method of the present discourse during any of the laundry operation is very crucial for the uniform deposition of the CMC on the surface of the textile materials. In one non-limiting embodiment, the oil and grease resistant composition and the laundering aid can be mixed in weight ratio of from 1:10 to 10:1, or from about 1:5 to 5:1. In one non-limiting embodiment, the oil and grease resistant composition can be used in an amount till a dose of 0.01 wt. % to 10.0 wt. % of CMC is achieved.

As stated above, the oil and grease resistant composition used in the method of the present disclosure can be formulated in any forms suitable for its direct and indirect applications on the textile materials. Examples of such forms can include, but are not limited to, solutions, aerosols, emulsions, dispersions, foam, sprays, fine powdery solid forms, granular or particulate forms, and encapsulate and coated forms thereof.

In one non-limiting embodiment of the present disclosure, the composition can be formulated in solutions, emulsions, or aerosol forms. In another non-limiting embodiment of the present disclosure, the composition is present in the form of a solution. For this, the composition can be dissolved in a suitable solvent. The suitable solvent includes at least one solvent selected from the group consisting of an aqueous and a non-aqueous based solvent. In one non-limiting embodiment of the present disclosure, the composition is dissolved in an aqueous solvent. In another non-limiting embodiment, the solvent can be a combination of an aqueous and a non-aqueous based solvent. The non-aqueous solvent can be selected from the group consisting of $C_1$ to $C_4$ mono-hydric alcohols, $C_1$ to $C_{12}$ polyhydric alcohols such as $C_2$ to $C_6$ alkylene glycols and $C_2$ to $C_{12}$ polyalkylene glycols, $C_2$ to $C_6$ alkylene carbonates, and mixtures thereof. Examples of such non-aqueous based solvents can include, but are not limited to, ethanol, propanol, isopropanaol, n-butanol, ethylene glycol, propylene glycol, dipropylene glycol, propylene carbonate, butyl carbitol, phenylethyl alcohol, 2-methyl 1,3-propanediol, hexylene glycol, glycerol, polyethylene glycol, 1,2-hexanediol, 1,2-pentanediol, 1,2-butanediol, 1,4-cyclohexanediol, pinacol, 1,5-hexanediol, 1,6-hexanediol, 2,4-dimethyl-2,4-pentanediol, 2,2,4-trimethyl-1,3-pentanediol, 2-ethyl-1,3-hexanediol, phenoxyethanol, and mixtures thereof. The solvent can be present in an amount ranging from about 60.0 wt. % to about 99.9 wt. %, or from about 50.0 wt. % to 99.9 wt. %, or from about 40 wt. % to about 80 wt. %, or from about 10 wt. % to about 30 wt. %, or from about 1.0 wt. % to about 20 wt. %, from about 0.5 wt. % to about 10 wt. %, of the composition weight. When the solvent comprises a combination of water and at least one of the non-aqueous solvent, the water is present in an amount greater than about 50.0 wt. %, or greater than about 10.0 wt. % of the composition; and the balance of the solvent comprises the non-aqueous solvent. The amount of blocky carboxymethyl cellulose that can be present in the oil and grease resistant composition of the present disclosure varies in the range of from 0.01 wt. % to 10.0 wt. %, or from 0.1 wt. % to about 8.0 wt. %, or from 0.5 wt. % to about 6 wt. %, or from 1.0 wt. % to about 5 wt. %, based on the total composition weight. Similarly, the adjunct materials can be present in an amount of from 0.0 wt. % to about 90.0 wt. %, 0.0 wt. % to about 70.0 wt. %, 0.0 wt. % to about 50.0 wt. %, 0.0 wt. % to about 30.0 wt. %, or from about 0.1 wt. % to about 30.0 wt. %, or from about 0.5 wt. % to about 10.0 wt. %, or from about 1.0 wt. % to about 5.0 wt. % of the composition weight.

The method according to the present disclosure provides uniform and stable deposition of the oil and grease resistant composition on the surface of the textile materials. The amount of CMC (present in the oil and grease resistant composition) deposited on the surface of the textile materials according to the present disclosure can vary in the range of from about 0.001 gm to about 10.0 gm, or from about 0.001 to about 5.0 gm, or from about 0.001 gm to about 1.0 gm, or from about 0.001 gm to about 0.5 gm per gm of the textile material.

The following examples illustrate the present disclosure, parts and percentages being by weight, unless otherwise indicated. Each example is provided by way of explanation of the present disclosure, not limitation of the present disclosure. In fact, it will be apparent to those skilled in the art that various modifications and variations can be made in the present disclosure without departing from the scope or spirit of the invention. For instance, features illustrated or described as part of one embodiment, can be used on another embodiment to yield a still further embodiment. Thus, it is intended that the present disclosure covers such modifications and variations as come within the scope of the appended claims and their equivalents.

These examples are presented herein for purposes of illustration of the present disclosure and are not intended to be limiting, for example, the method of treating textile materials.

EXAMPLES

Treatment of Textile Materials

Example-1: Treatment of Cotton and Polyester Fabrics with Carboxymethyl Cellulose (CMC)

Cotton and polyester fabrics, 1 gram, size 7×11 centimeter, were soaked separately into 0.1 wt. %, 0.5 wt. % and 1.0 wt. % aqueous solutions of carboxymethyl cellulose (CMC) in distilled water. In a separate experiment, cotton and polyester fabrics were soaked in distilled water (control experiment). After 10 minutes, all the soaked fabrics were taken out, air dried overnight and then used for oil and grease-based air pollutants deposition resistance analysis as per the method given below. Two different carboxymethyl celluloses were used for treating the cotton and polyester fabrics: first carboxymethyl cellulose of degree of substitution (DS) of 0.55; and second carboxymethyl cellulose of degree of substitution (DS) of 0.8.

Example-2: Treatment of Cotton and Polyester Fabrics with Carboxymethyl Cellulose (CMC) in the Presence of Fabric Conditioner (Fabric Conditioner Used as a Laundering Aid)

In this experiment, cotton fabrics were treated with carboxymethyl cellulose during laundry post wash treatment cycle wherein the carboxymethyl cellulose was mixed with a fabric conditioner. For this, 10 g of fabric conditioner was dissolved in 1 L of water. 0.1 wt. % aqueous solution of blocky CMC with DS 0.55 (10 gm of block CMC based on 1 L of water) was also added into the water mixed with the fabric conditioner. Followed to this, cotton fabrics, 1 gram, size 7×11 centimeter, were dipped in the water mixed with the fabric conditioner and CMC. The fabrics were allowed to soak for 10 minutes. After 10 minutes, the treated cotton fabrics were taken out, rinsed with water, and air dried overnight. Another two sets of experiments were also carried out in the same manner wherein the cotton fabrics of the same dimensions were treated with 0.1 wt. % and 0.5 wt. % aqueous solutions of CMC with DS 0.81. The treated and dried cotton fabrics thus obtained were then used for oil and grease-based air pollutant deposition resistance analysis. Control cotton fabric was also treated in the same manner with fabric conditioners without CMC.

Example 3: Treatment of Cotton and Polyester Fabrics with Carboxymethyl Cellulose (CMC) During Laundry Main Wash Cycle (Detergent being Used as Laundering Aid)

In this example, fabrics were treated with carboxymethyl celluloses (CMCs) during laundry main wash cycle (detergent wash). For this, 2 gm of liquid laundry detergent (AATCC standard) was dissolved in 1 L of water. 1.0 wt. % aqueous solution of CMC with DS 0.55 was also added in the water. Cotton and polyester fabrics, 1 gram, size 7×11 centimeter each, were then washed with the water mixed with the liquid laundry detergent and the CMC. The main wash cycle was carried out in Tergotometer at 60 rpm, 30° C. for 10 min. After 10 minutes, the washed and treated fabrics thus obtained were rinsed with 1.5 L tap water and air dried overnight. Another set of two different experiments were also carried out in the same manner except CMC with DS 0.55 was used along with the liquid laundry detergent. Control cotton and polyester fabrics were also washed in the same manner using only liquid laundry detergent without using any CMC.

Oil and Grease Resistance Analysis

The treated and dried fabrics of Examples 1, 2, and 3 were then exposed to smoke in the smoke chamber and analyzed for oil and grease-based air pollutants deposition resistance through fluorescence method as described hereinbelow.

Example-3: Polluted Fabric Preparation

The oil and grease content present in the cigarette smoke was used to study the deposition on fabrics. The cigarette smoke chamber was used for simulating the air pollutants. The treated fabrics obtained from Examples 1, 2 and 3 were hung in a cigarette smoke chamber. Six cigarettes were light up and the cigarette smoke was pumped into the chamber. After 3 minutes, the pump was turned off. The Particulate matter (PM) (particulate matter particle size of from 2.5 micron to 10 micron) concentration was constant in the chamber (over 1500/5000 ppm). After 30 minutes, all the treated fabrics were removed from the smoke chamber. All the treated fabrics of Examples 1, 2, and 3 were tested individually.

The treated fabrics once removed from the smoke chamber were now soaked into 10 ml isopropanol separately under ultrasonic (53 kHz, room temperature) for 10 minutes to extract the oil and grease contents deposited on the surface of the treated fabrics. The isopropanol extractions were then analyzed by fluorescence spectra.

Figure 2:
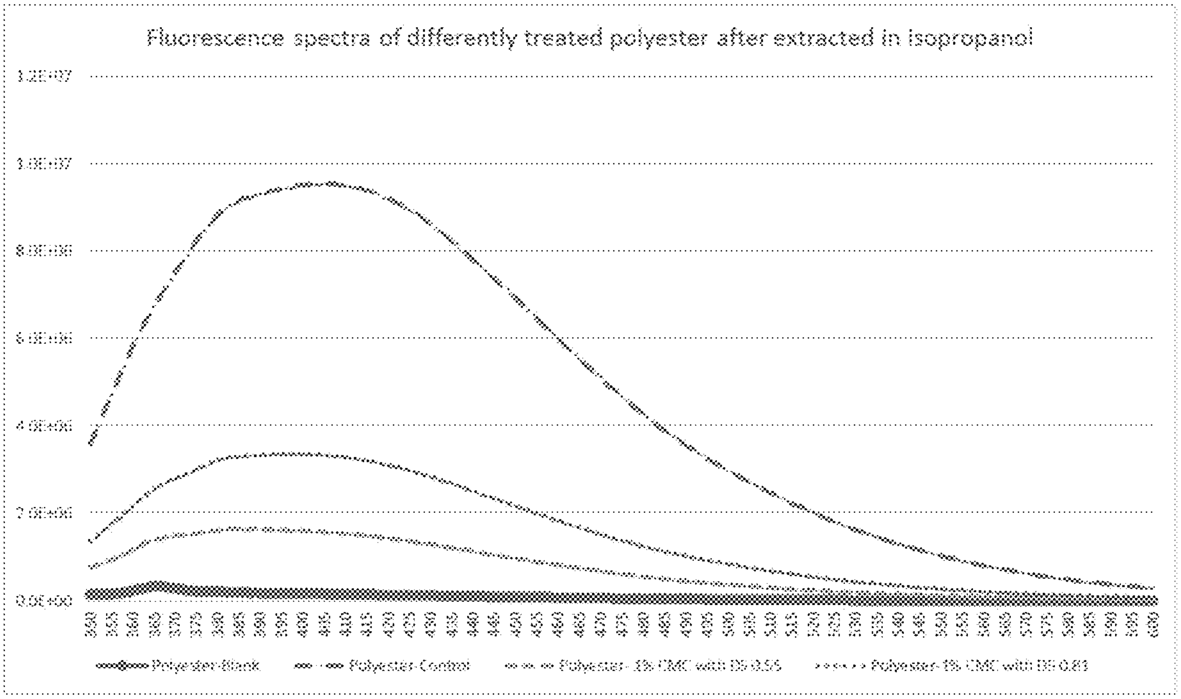
FIG. 2 shows Fluorescence Spectra of the pollutants on (i) smoked untreated polyester fabric; and (ii) smoked blocky carboxymethyl treated polyester fabric wherein the pollutants are extracted in isopropanol (Excitation wavelength 330 nm).

There are more than 7000 chemical agents are present in tobacco smoke. Hundreds of them are toxic and at least 70 are known to cause cancer and polycyclic aromatic hydrocarbons (PAHs) are among them. After soaking into isopropanol, the PAHs from the cigarette smoke deposited on the treated fabrics were extracted from the fabrics. At an excitation wavelength of 330 nm, the extraction could be detected at an emission wavelength of around 400 nm. (FIG. 1 & FIG. 2). The peak area was calculated for each curve. The relative area of extraction of treated fabrics was compared with that of control fabrics.

Figure 3:
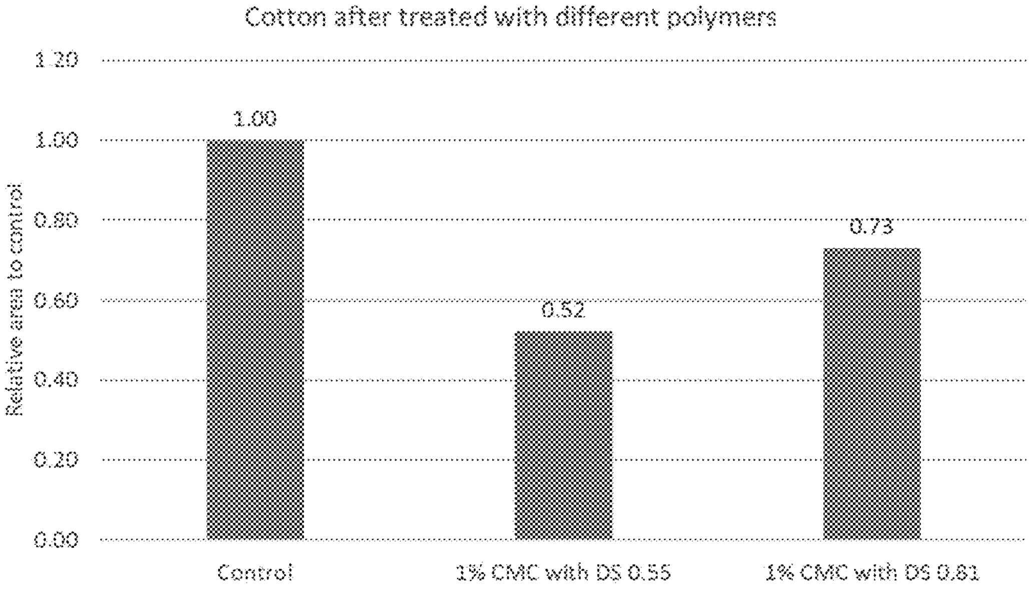
FIG. 3 and FIG. 4 show relative oil deposition amount on blocky carboxymethyl cellulose (CMC) treated cotton fabrics, as compared to untreated fabrics (control).
Figure 4:
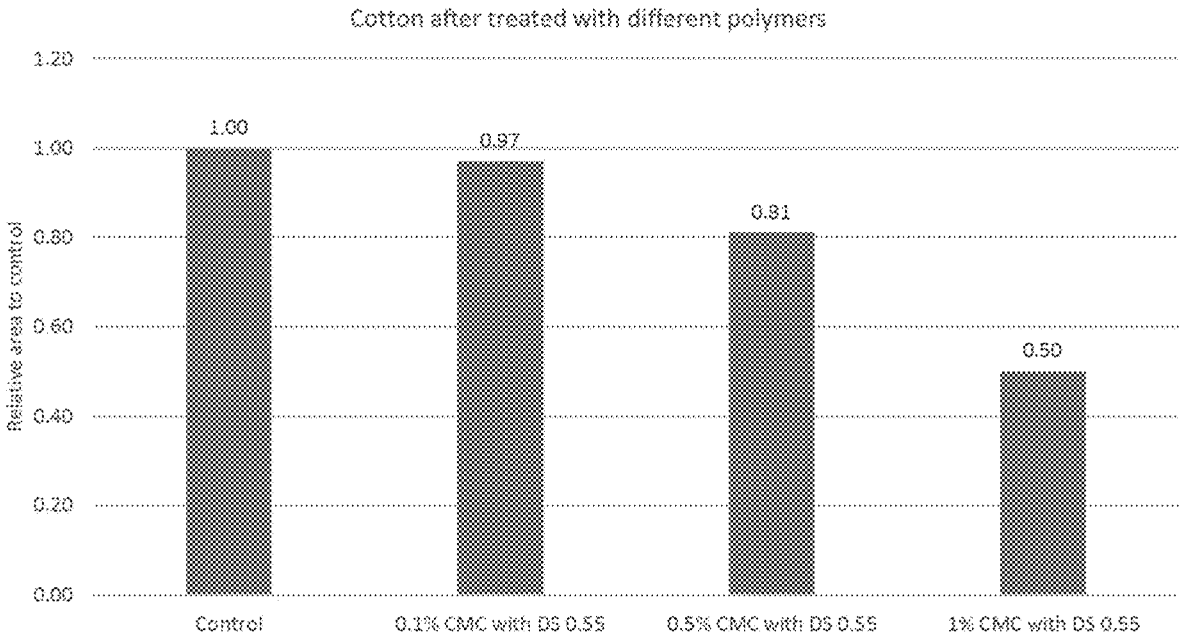

The cotton fabrics with or without treating with 1.0 wt. % CMC with DS 0.55 and 1.0 wt. % CMC with DS 0.81 solutions of Example 1 were exposed to cigarette smoke for 30 minutes as per the above described method. As shown in FIG. 3, the cotton fabric soaked with 1.0 wt. % CMC with DS 0.55 have almost 50% reduction of oil adhesion, while the cotton fabric soaked with 1.0 wt. % CMC with DS 0.81 has 27% reduction. The analysis of the oil and grease-based air pollutants deposited on the cotton fabrics treated with the 0.1 wt. % and 0.5 wt. % aqueous solution of blocky CMC with DS 0.55 of Example 1 were shown in FIG. 4. As evidenced from FIG. 4, the oil adhesion reduced with the increase of CMC concentration from 0.1 wt. % to 1.0 wt. %.

Figure 5:
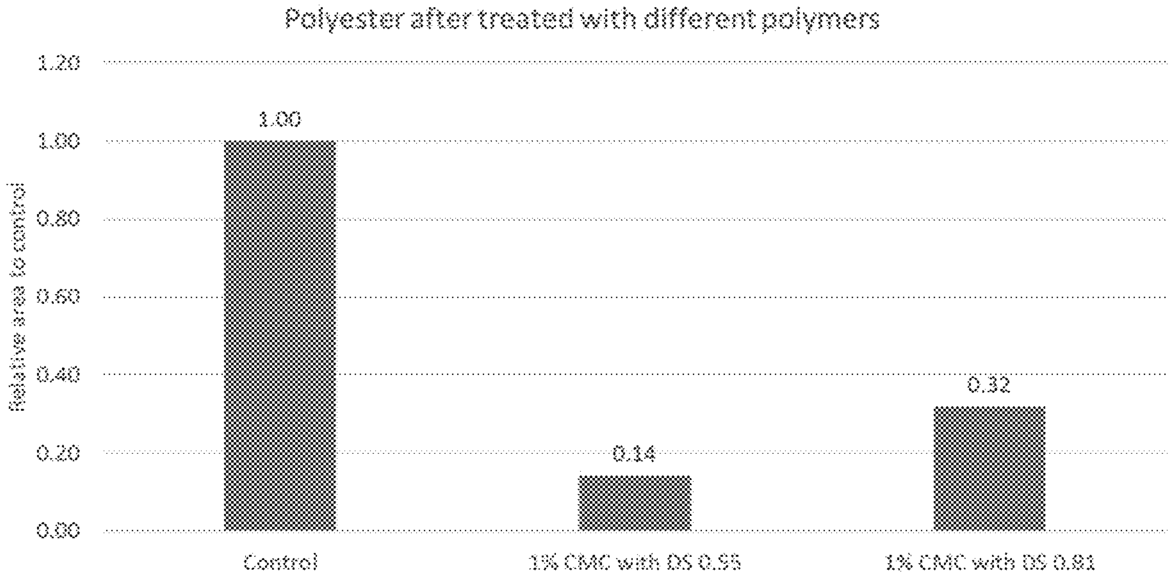
FIG. 5 shows relative oil deposition amount on blocky carboxymethyl cellulose (CMC) treated polyester fabrics, as compared to untreated fabrics (control).

The analysis of the oil and grease-based air pollutants deposited on the polyester fabrics with or without treating with 1.0 wt. % CMC with DS 0.55 and 1.0 wt. % CMC with DS 0.81 solutions of Example 1 was shown in FIG. 5. As showed in FIG. 5, the polyester fabric treated with 1.0 wt. % CMC with DS 0.55 have almost 86% reduction of oil adhesion, while the polyester fabric treated with 1 wt. % CMC with DS 0.81 has 68% reduction.

Figure 6:
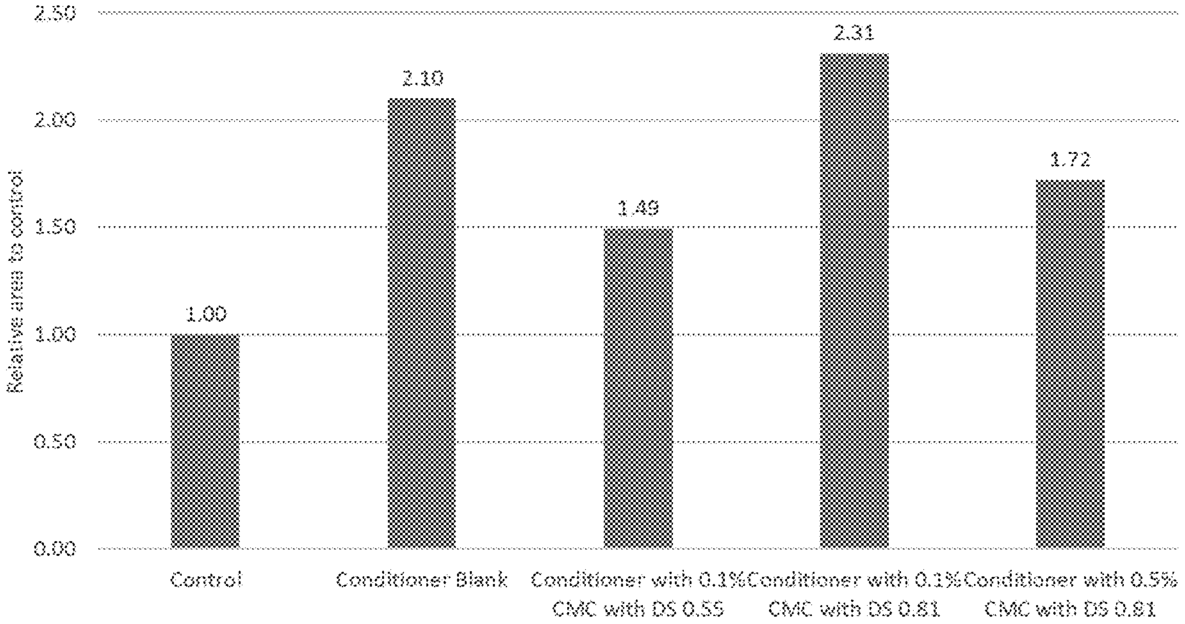
FIG. 6 shows relative oil deposition amount on cotton fabrics washed with 1% blocky carboxymethyl cellulose (CMC) in commercial conditioner, as compared to the fabrics washed with commercial conditioner only (control).

The analysis of the oil and grease-based air pollutants deposited on the treated cotton fabrics of Example 3 was shown in FIG. 6. As shown in FIG. 6, the cotton fabric after conditioner washing has 2 times more oil adhesion in cigarette smoke, while the conditioner with 0.1 wt. % of CMC with DS 0.55 and 0.5 wt. % CMC with DS 0.81 could significantly reduce the oil deposition as compared to conditioner without CMC.

Figure 7:
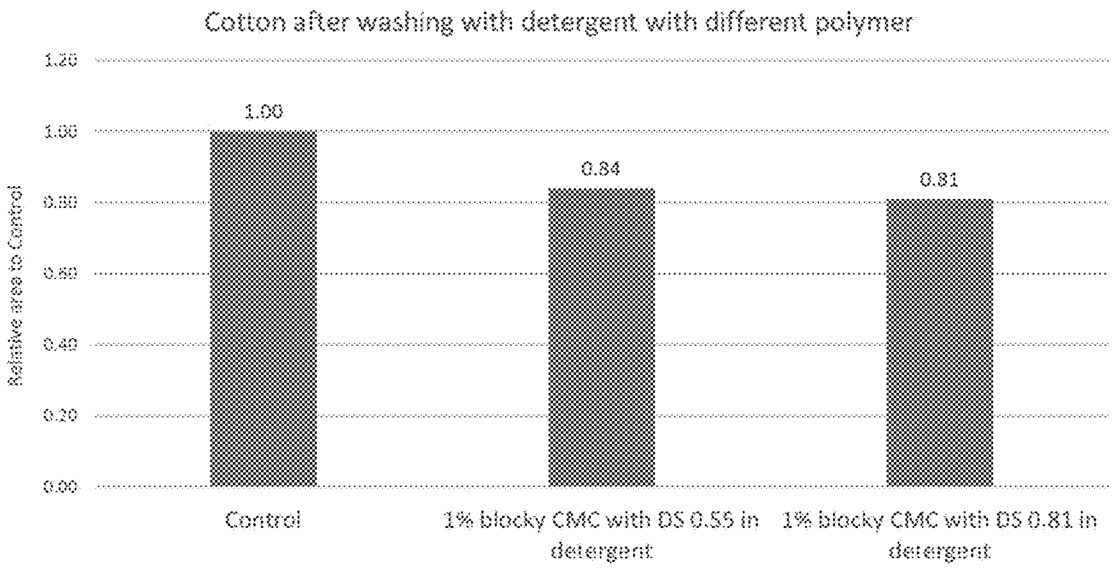
FIG. 7 shows relative oil deposition amount on cotton fabrics washed with blocky carboxymethyl cellulose (CMC) in AATCC standard liquid laundry detergent, as compared to the fabrics washed with AATCC standard liquid laundry detergent only (control).
Figure 8:
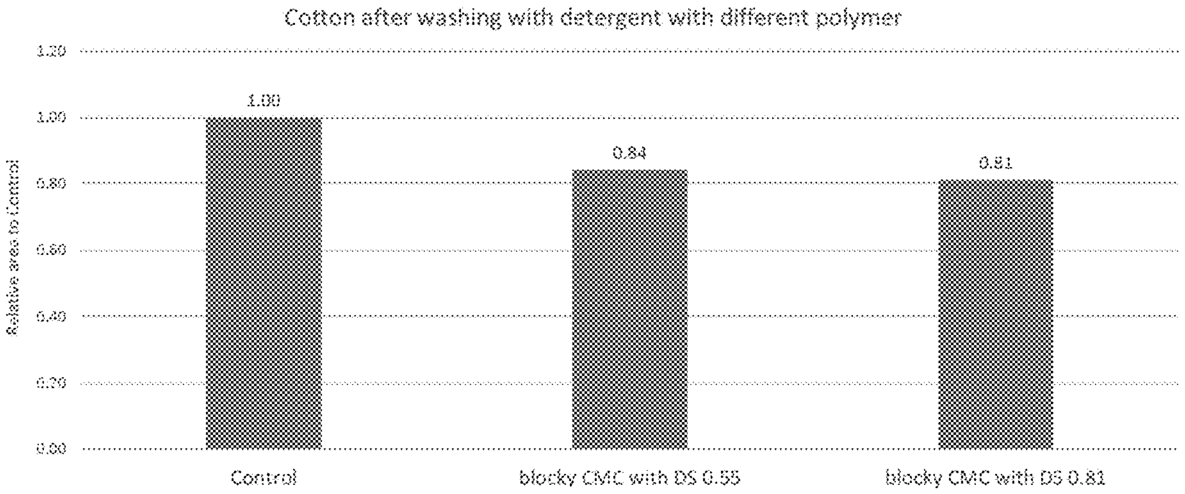
FIG. 8 shows relative oil deposition amount on polyester fabrics washed with blocky carboxymethyl cellulose (CMC) in AATCC standard liquid laundry detergent, as compared to the fabrics washed with AATCC standard liquid laundry detergent only (control).

The analysis of the oil and grease based air pollutants deposited on the treated and dried fabrics cotton and polyester fabrics of Example 3 was shown FIG. 7 and FIG. 8, respectively, As shown in FIG. 7, the cotton fabrics treated with 1.0 wt. % aqueous solution of blocky CMC with DS 0.55 and blocky CMC with DS 0.81 during the laundry main wash cycle have almost 20% reduction of oil adhesion as compared with the control cotton fabric. Similarly, the polyesters fabrics washed with CMC with DS 0.55 and blocky CMC with DS 0.81 during the laundry main wash cycle have 60-70% reduction of oil adhesion compared with controlled polyester fabric.

All of the compositions and methods disclosed herein can be made and executed without undue experimentation in light of the present disclosure. While the compositions and methods of the present disclosure have been described in terms of preferred embodiments, it will be apparent to those of ordinary skill in the art that variations may be applied to the compositions and methods and in the steps or in the sequence of steps of the method described herein without departing from the concept, spirit and scope of the present disclosure. All such similar substitutes and modifications apparent to those skilled in the art are deemed to be within the spirit, scope and concept of the present disclosure.

What is claimed is:

1. A method for providing a textile material which is resistant to the deposition of oil-and grease-based air pollutants, the method comprising the steps of:

i. treating the textile material with an oil and grease resistant composition comprising blocky carboxymethyl cellulose (CMC) and optionally at least one adjunct material; and ii. drying the resultant textile material of step (i) wherein the blocky carboxymethyl cellulose has a degree of substitution (DS) of at least 0.4, and a degree of blockiness (DB) of at least 0.5, wherein the blocky carboxymethyl cellulose has a molecular weight in the range of from 100,000 Daltons to 1.5 million Daltons.

2. The method according to claim 1, wherein the blocky carboxymethyl cellulose has a degree of substitution (DS) in the range of from 0.4 to 1.2, and a degree of blockiness (DB) in the range of from 0.5 to 0.8.

3. The method according to claim 1, wherein the textile material is treated with the oil and grease resistant composition during laundry operations.

4. The method according to claim 3, wherein the laundry operations include pre-treating or soaking the textile materials, washing the textile materials with detergents or soaps (main wash), rinsing the textile materials with water, post-wash treating the textile materials after the final rinse, or drying the textile materials after the pre-treating or soaking or after the main wash or after the final rinse with water or after the post-wash treating, or any combinations thereof.

5. The method according to claim 1, wherein the oil and grease resistant composition is uniformly deposited on the surface of the textile material in an amount of about 0.001 gm to about 10.0 gm per gm of the textile material.

6. A method for providing a textile material which is resistant to the deposition of oil-and grease-based air pollutants, the method comprising the steps of:

i. treating the textile material with an oil and grease resistant composition comprising blocky carboxymethyl cellulose (CMC); and ii. drying the resultant textile material of step (i) wherein the blocky carboxymethyl cellulose has a degree of substitution (DS) of at least 0.4, and a degree of blockiness (DB) of at least 0.5, wherein the blocky carboxymethyl cellulose has a molecular weight in the range of from 100,000 Daltons to 1.5 million Daltons.

7. The method according to claim 6, wherein the blocky carboxymethyl cellulose has a degree of substitution (DS) in the range of from 0.4 to 1.2, and a degree of blockiness (DB) in the range of from 0.5 to 0.8.

* * * * *